(12) United States Patent  
Mulcahey

(10) Patent No.: US 7,372,276 B2
(45) Date of Patent: May 13, 2008

(54) DIGITAL LOCATING SYSTEM AND DEVICE FOR UNDERGROUND OBJECT DETECTION

(75) Inventor: Butch Mulcahey, Glendale, CA (US)

(73) Assignee: Goldak, Inc., Glendale, CA (US)

( * ) Notice: Subject to any disclaimer, the term of this patent is extended or adjusted under 35 U.S.C. 154(b) by 312 days.

(21) Appl. No.: 11/060,053

(22) Filed: Feb. 16, 2005

(65) Prior Publication Data

US 2006/0181280 A1 Aug. 17, 2006

(51) Int. Cl.
*G01V 3/08* (2006.01)

(52) U.S. Cl. ..................... 324/326; 324/329
(58) Field of Classification Search ............... 324/326, 324/327, 328, 329
See application file for complete search history.

(56) References Cited

U.S. PATENT DOCUMENTS

| 5,055,793 | A | * | 10/1991 | Mulcahey | ............... 324/326 |
| 5,990,683 | A | | 11/1999 | Mercer | |
| 6,005,532 | A | | 12/1999 | Ng | |
| 6,496,008 | B1 | | 12/2002 | Brune et al. | |
| 6,653,837 | B2 | | 11/2003 | Brune et al. | |
| 6,756,784 | B2 | | 6/2004 | Mercer | |
| 6,768,307 | B2 | | 7/2004 | Brune | |
| 6,838,881 | B2 | | 1/2005 | Mercer | |
| 7,013,990 | B1 | * | 3/2006 | Nickel et al. | ............... 175/45 |
| 2006/0091888 | A1 | * | 5/2006 | Holman et al. | ............. 324/326 |

* cited by examiner

*Primary Examiner*—Patrick Assouad
*Assistant Examiner*—David M. Schindler
(74) *Attorney, Agent, or Firm*—Trojan Law Offices

(57) ABSTRACT

An underground digital locating system includes a receiver capable of acquiring a signal produced by an underground object and displaying a digital representation of the orientation of underground object and of its depth. The system includes a carrying case for the digital locating receiver, the carrying case further including a transmitter for energizing underground objects to emit a magnetic field. A method of locating an underground object using the described system is also disclosed, as well as methods of measuring a flux field and translating a flux field signal of an underground object into a visual representation of the underground object on the display screen of the locating receiver.

9 Claims, 12 Drawing Sheets

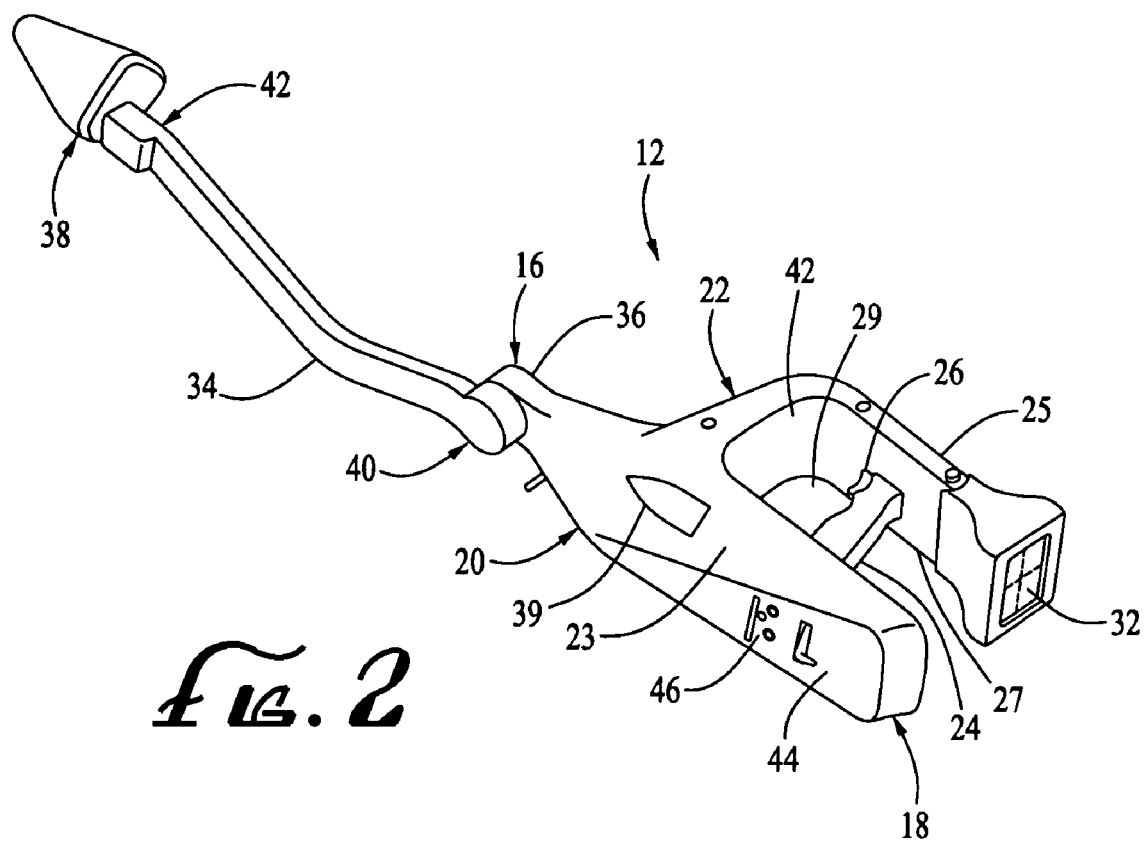

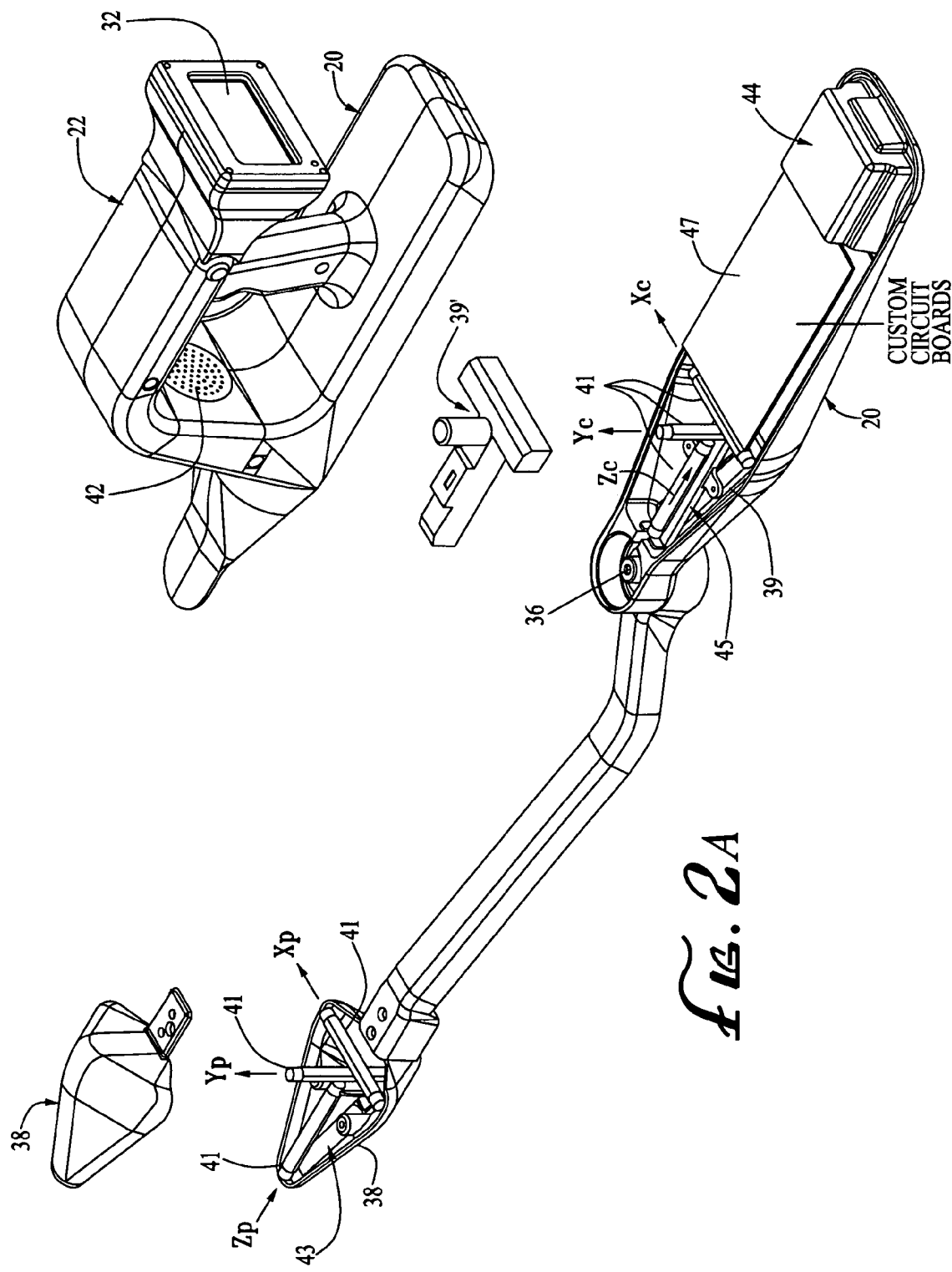

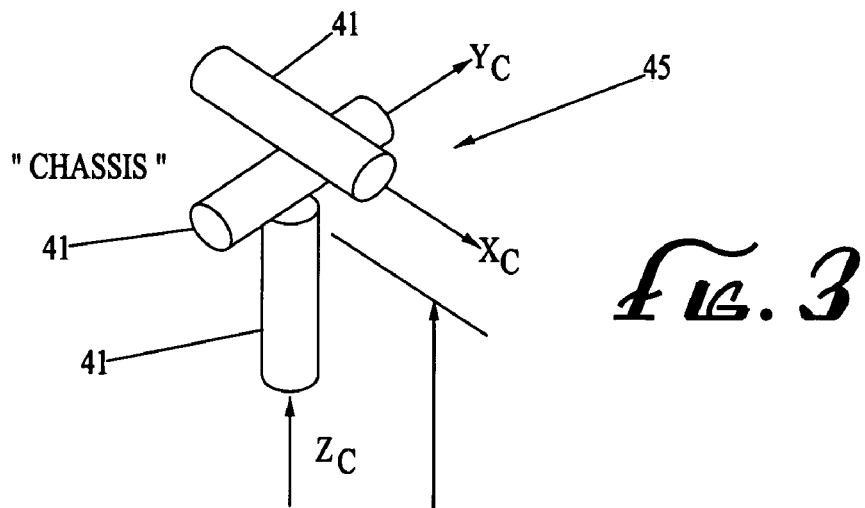
*fig.3*
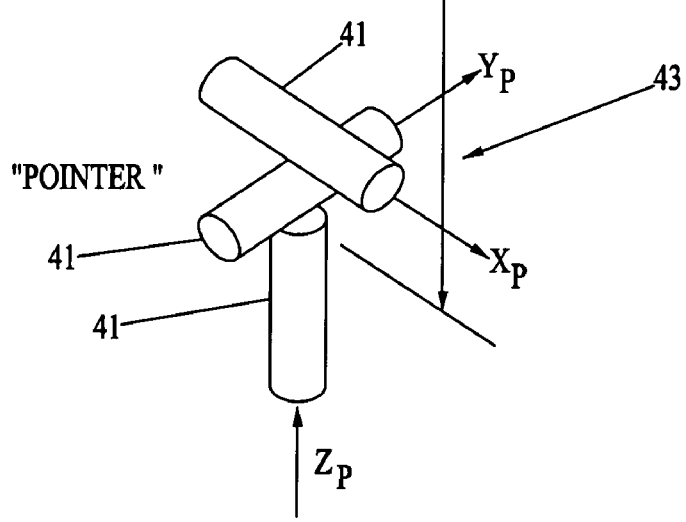
*fig.4*
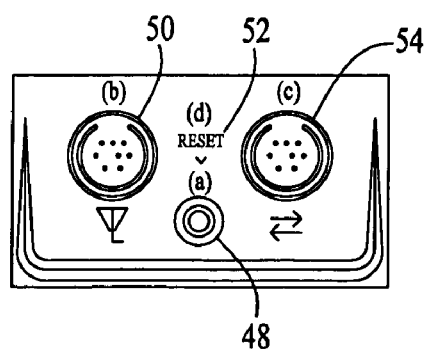

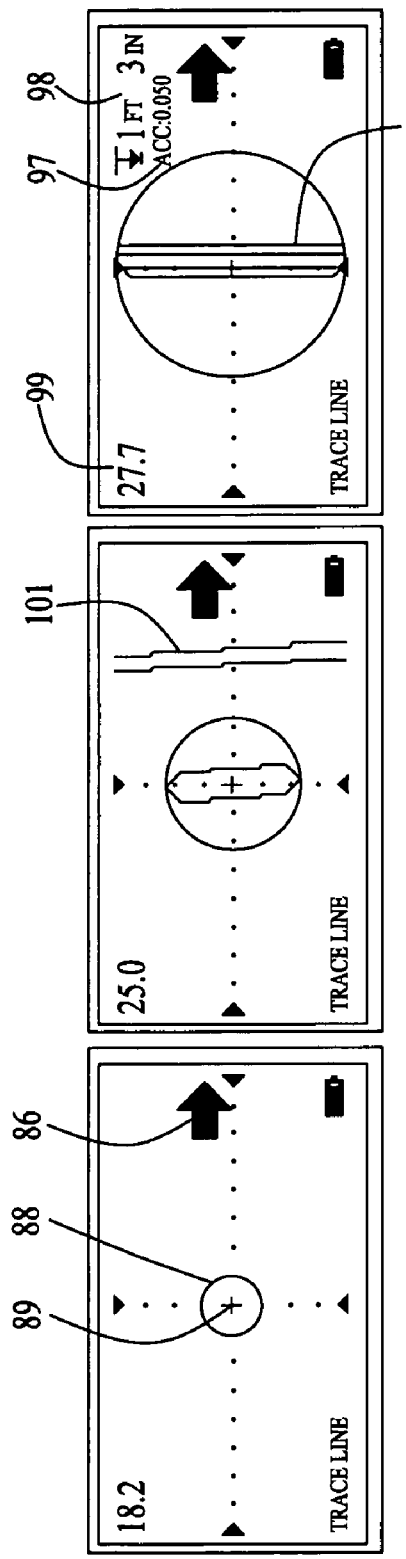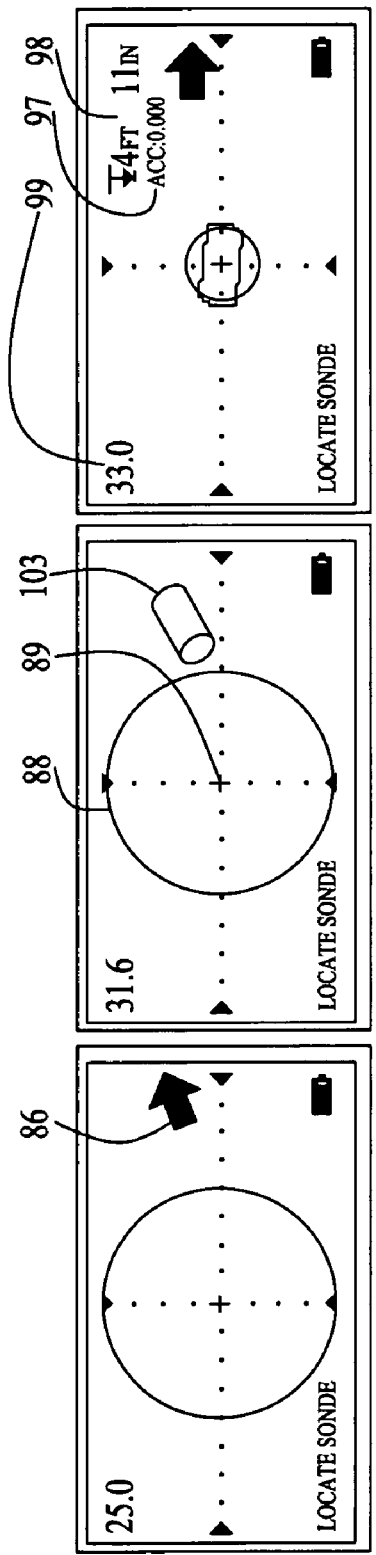

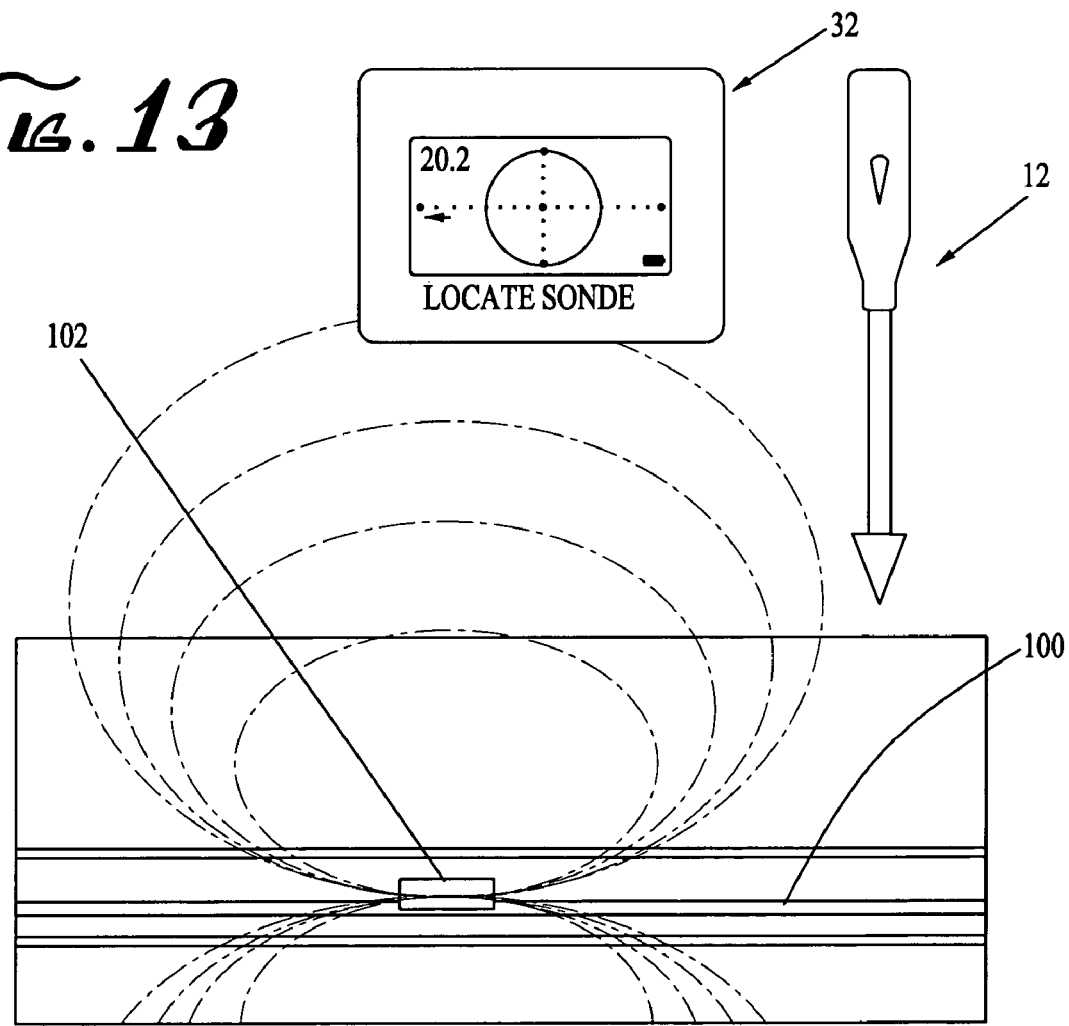

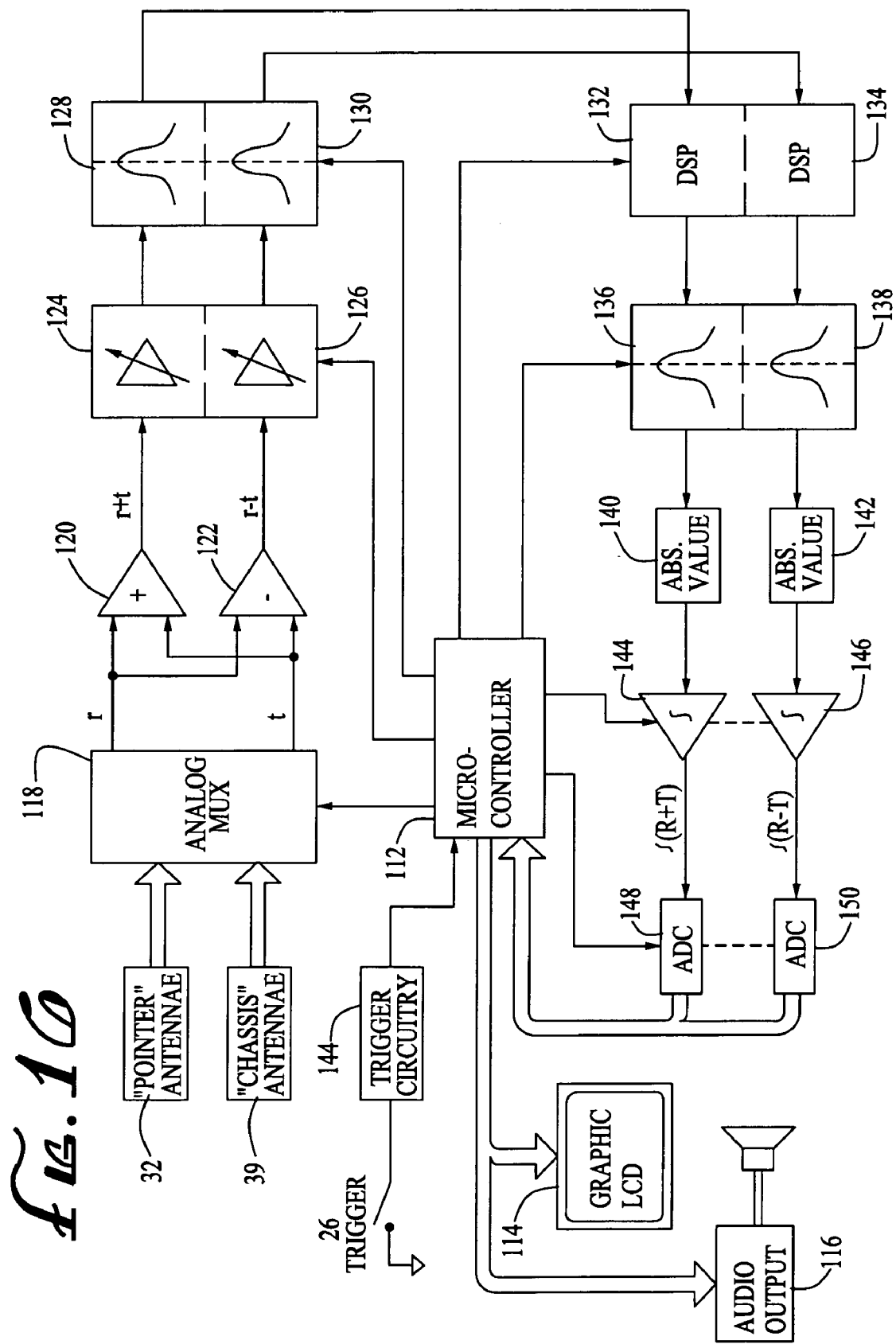

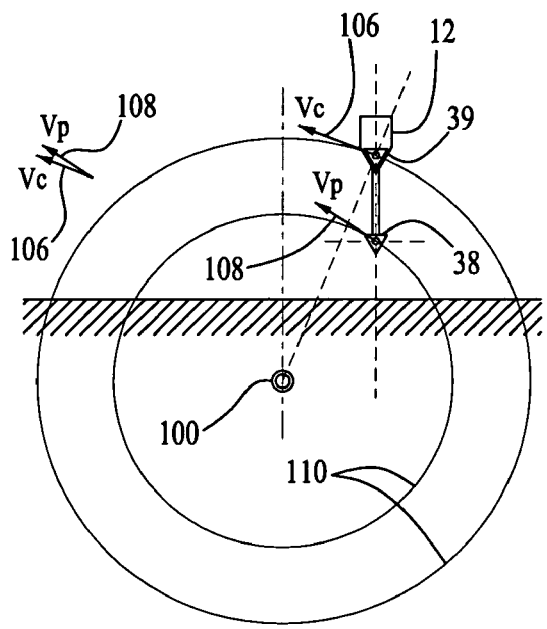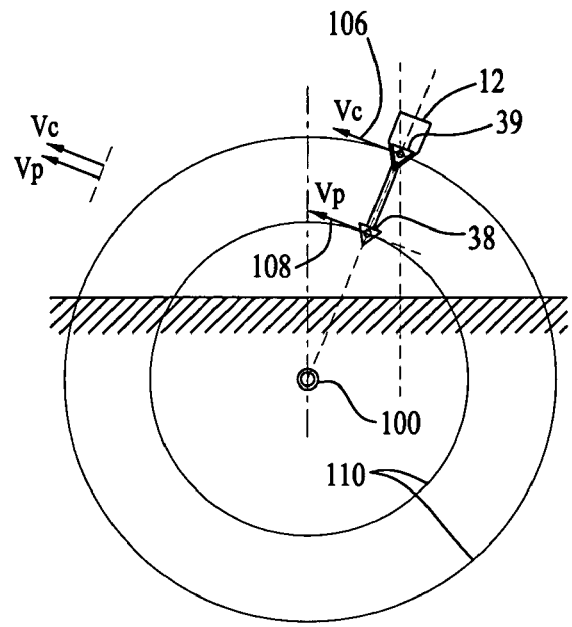
fig. 17A  fig. 17B
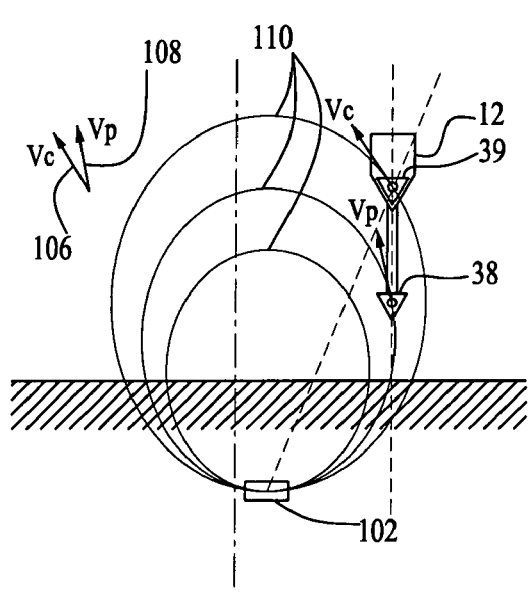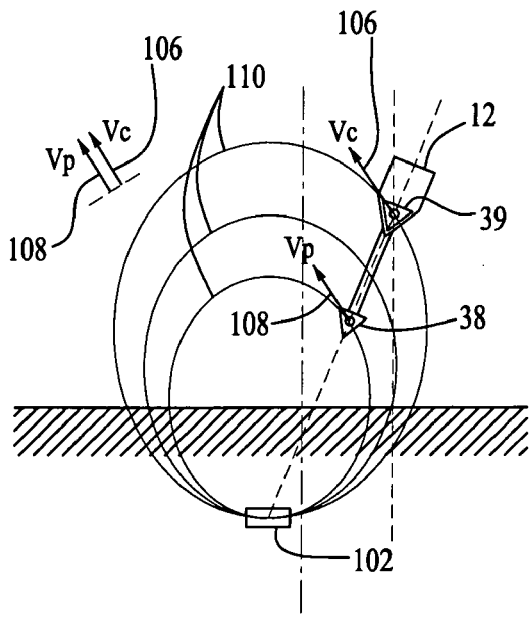
fig. 17C  fig. 17D

DIGITAL LOCATING SYSTEM AND DEVICE FOR UNDERGROUND OBJECT DETECTION

FIELD OF THE INVENTION

The field of this invention relates generally to digital locating systems, and more specifically, to underground digital locating systems that are capable of identifying the position, orientation and depth of an underground object, such as a utility line, a pipe line or a sonde.

BACKGROUND OF THE INVENTION

Many common construction and utility operations that require soil excavation depend on the operator's knowledge of the orientation and depth of underground utility lines, pipelines and cable lines. Because contact by excavating equipment is almost invariably damaging to underground lines, it is very important to know the exact position of those lines prior to commencing digging activities. Knowledge of underground line position allows the operator to avoid coming in contact with and damaging such lines.

There are several known locating systems that are currently used to locate underground lines. Most of the known locators involve receiver detection of a magnetic field derived from electrical current directly fed or induced onto an underground line.

The magnetic field lines emanating from a line are essentially cylindrical in shape with the center of the cylinder being the current-carrying line itself. As the current flows along the line, losses occur as a result of displacement and induction of currents into the soil. When the rate of loss along the line length is not great, depth can be computed through the use of a signal strength ratio. For lines that run straight underground along a certain depth, the magnetic field strength is inversely proportional to the distance from the line to the receiver. Depth is typically determined by taking two signal strength readings at different locations directly above the line.

U.S. Pat. No. 6,756,784 to Mercer et al. describes a locator/monitor that is capable of locating a boring tool and monitoring the progress of the tool for control purposes. The locator/monitor described in Mercer achieves its goals through the operation of an antenna assembly that features one cluster of two orthogonal antennas that are in spatial proximity to each other and not a fixed distance apart.

The locator/monitor described in Mercer operates in the following way: (1) an operator locates the underground transmitter (mounted on a boring tool); (2) operator deploys the receiver/locator at a first height above the transmitter location and measures the magnetic field strength emanating from the transmitter; and (3) deploys the receiver at a second height to measure the magnetic field strength emanating from the transmitter. Although this device may be accurate, its use is time-consuming, as the operator has to take measurements at two different heights.

U.S. Pat. No. 6,768,307 to Brune et al. describes a system for flux plane locating that includes a boring tool with a transmitter that transmits a locating field such that the locating field exhibits a pair of locate points in relation to the surface to the ground and a portable locator that is used to measuring the intensity of the locating field. The locator contains one antenna cluster that contains three orthogonally disposed antennas, two in a horizontal plane, and one disposed in a vertical plane. As with the previous device, the use of this locator suffers from the disadvantage of being time consuming, as it forces the operator to move the locator to several positions before arriving at the final determination of line location or depth.

There are also presently known line-locating devices that employ two antennas and logic circuitry to determine depth. The antennas are separated by a fixed distance. Because the separation distance is known, cable depth can be computed by interpreting the magnetic field strength.

U.S. Pat. No. 5,920,194 to Lewis et al. describes a locator that has spaced antennas that detect electromagnetic signals from an underground line. The locator contains a processor that analyzes the electromagnetic signals and determines the separation of the locator and the underground line, both in terms of the direction corresponding to the spacing of the antennas and the perpendicular direction to the underground line. The display on the device shows the separation of the locator and the object.

This device suffers from several disadvantages. First, because the device determines the separation between itself and the underground line by measuring the angles between its antennas and the surface of the underground solenoid, the angle of the positioning of the locator becomes critical. Lewis et al. attempts to solve that problem by including a tilt sensor in its device, which in all likelihood makes the device more expensive.

Also, the locator is preferably a ground penetration probe that is driven into the ground to maintain a constant angular position during measurements. This may be impractical in certain locations where the ground is difficult to penetrate. A further disadvantage of this locator is that it provides a relatively precise measurement only after requiring the operator to measure the separation of the locator and the underground line at two different locator positions and comparing the two results. Thus, the operation of the device in Lewis is time consuming and prone to unnecessary errors if the locator is not identically positioned at both measurement locations.

Measurement accuracy in devices of the prior art is often affected by differential drifting of the electronics associated with the antennas as well as by differential responses of the antennas themselves. To increase sensitivity, ferrite rods are sometimes employed to enhance the effective capture area of the antennas. As a result of the antenna separation, both antennas may not experience the same thermal environment. This can be a problem because the characteristics of ferrite vary measurably with temperature and are not consistent between rods.

There are other problems to be overcome when measuring AC flux fields using multiple ferrite antennas. For example, synchronization is a major problem. Because AC signals are characterized by amplitude and phase, both must be accounted for to get accurate results. If the phases of signals being measured on separate antennas are somehow shifted relative to each other without account, then there is no way of knowing at any given instance what the actual relative responses of those antennas are. Often, amplifying and filtering circuits will by their very nature introduce phase shifts that are not controllable enough to maintain accurate resulting signals on the back end. A second problem of using ferrite antennas is measurement accuracy and calibration. This is because of variations in ferrite permeability, winding anomalies, etc.

Therefore, a need exists for a digital locating system that can not only accurately predict the location, orientation and depth of an underground line using simple and quick procedure, but one that can also adequately account for anomalies in the ferrite antennas and component tolerance errors in the processing circuitry itself.

BRIEF DESCRIPTION OF THE INVENTION

The invention satisfies this need. According to the invention, there is provided a digital locating system for identifying the position, orientation and depth of underground objects, such as underground lines and transmitters known as sondes. The locating system is compact and lightweight, and is designed for easy transportation and easy use by a single operator.

In the preferred embodiment of the invention, the system of the invention comprises a digital receiver for location of underground lines and a digital transmitter case, adapted for housing the digital receiver and incorporating a digital transmitter therein. The digital receiver is adapted for receiving a locating signal from an underground object, processing the information, and producing a video and audio output for the user regarding the predicted location of the underground object. The underground object can be a utility line, a pipeline, or a sonde.

In another embodiment, the system of the invention includes a connection cable for connecting the digital transmitter to an underground object. Connection of the digital transmitter to the underground object via the connection cable allows the transmitter to energize the underground object of interest.

In yet another embodiment, the system further includes a ground rod that provides grounding to the connection cable. In yet another embodiment of the invention, the system is capable of energizing the underground object of interest by induction. In this embodiment, the digital transmitter of the system does not have to be directly connected to the underground object.

In the preferred embodiment of the invention, the digital receiver comprises a main body that includes a microcontroller and circuitry for processing locating signals, a display screen for providing visual feedback to a user during operation, a pistol grip and trigger to select and execute menu choices for receiver operation, an antenna arm containing an antenna set at one end and swivelably connected to the receiver body at its other end, another antenna set housed within the main body, and a speaker for providing audible signals to the user during locating operations.

In the preferred embodiment, the carrying case of the invention comprises two halves connected in such a way as to permit the opening and closing of the case. One of the halves comprising the case contains a cavity designed to accommodate the digital receiver of the invention. One of the halves also includes at least one latch for keeping the case closed. The carrying case further comprises a handle, designed for comfortable carrying of the case. The carrying case also houses a digital transmitter designed to energize underground objects of interest.

The system provides accurate underground line orientation detection, as well as depth measurement. The device can operate at different locating frequencies and offers several locating modes.

In the preferred embodiment of the invention, the digital display of the locator offers a precise projection of the predicted image of the underground line. The display is capable of also projecting the predicted depth of the underground line, along with the approximate accuracy of the calculated depth prediction. The receiver of the present invention achieves its goals through the operation of an assembly comprising two sets of orthogonal ferrite-wound loop antennas, each set having three antennas.

It is the object of the invention to also provide a method for measuring the flux field surrounding an underground sonde. Another object of the invention is to also provide a method for translating the flux field measurements from an underground sonde into a digital representation of the underground object on a display screen.

Yet another object of the invention is to also provide a method for measuring the flux field surrounding an underground line. Yet another object of the invention is to also provide a method for translating the flux field measurements from an underground line into a digital representation of the line on a display screen.

BRIEF DESCRIPTION OF THE DRAWINGS

FIG. 2 is perspective view of the preferred embodiment of the digital locator of the invention.

FIG. 2A is an expanded cross sectional view of the interior structure of the digital locator of the invention.

FIG. 3 is a perspective view of the two antenna sets utilized within the digital locator of the invention.

FIG. 4 is a close-up perspective view of the connection panel of the digital locator of the invention.

FIGS. 11A, 11B, and 11C are all various close-up perspective views of the display screen during line tracing operations.

FIGS. 12A, 12B, and 12C are all various close-up perspective views of the display screen during sonde tracing operations.

FIG. 13 is a perspective view of the typical sonde-locating operations using the system of the invention.

FIG. 16 is a schematic diagram illustrating the operation of the various part of the digital locator in combination with the microcontroller and the circuitry, according to the invention.

FIG. 17A provides a diagrammatic illustration of the line locating operation, illustrating a situation when the field vectors are misaligned.

FIG. 17B provides a diagrammatic illustration of the line locating operation, illustrating a situation when the field vectors are aligned.

FIG. 17C provides a diagrammatic illustration of the sonde locating operation, illustrating a situation when the field vectors are misaligned.

FIG. 17D provides a diagrammatic illustration of the sonde locating operation, illustrating a situation when the field vectors are aligned.

DETAILED DESCRIPTION OF THE PREFERRED EMBODIMENTS

In the following description of the preferred embodiments reference is made to the accompanying drawings, which are shown by way of illustration of specific embodiments in which the invention may be practiced. It is to be understood that other embodiments may be utilized and structural and functional changes may be made without departing from the scope of the present invention.

Figure 1:
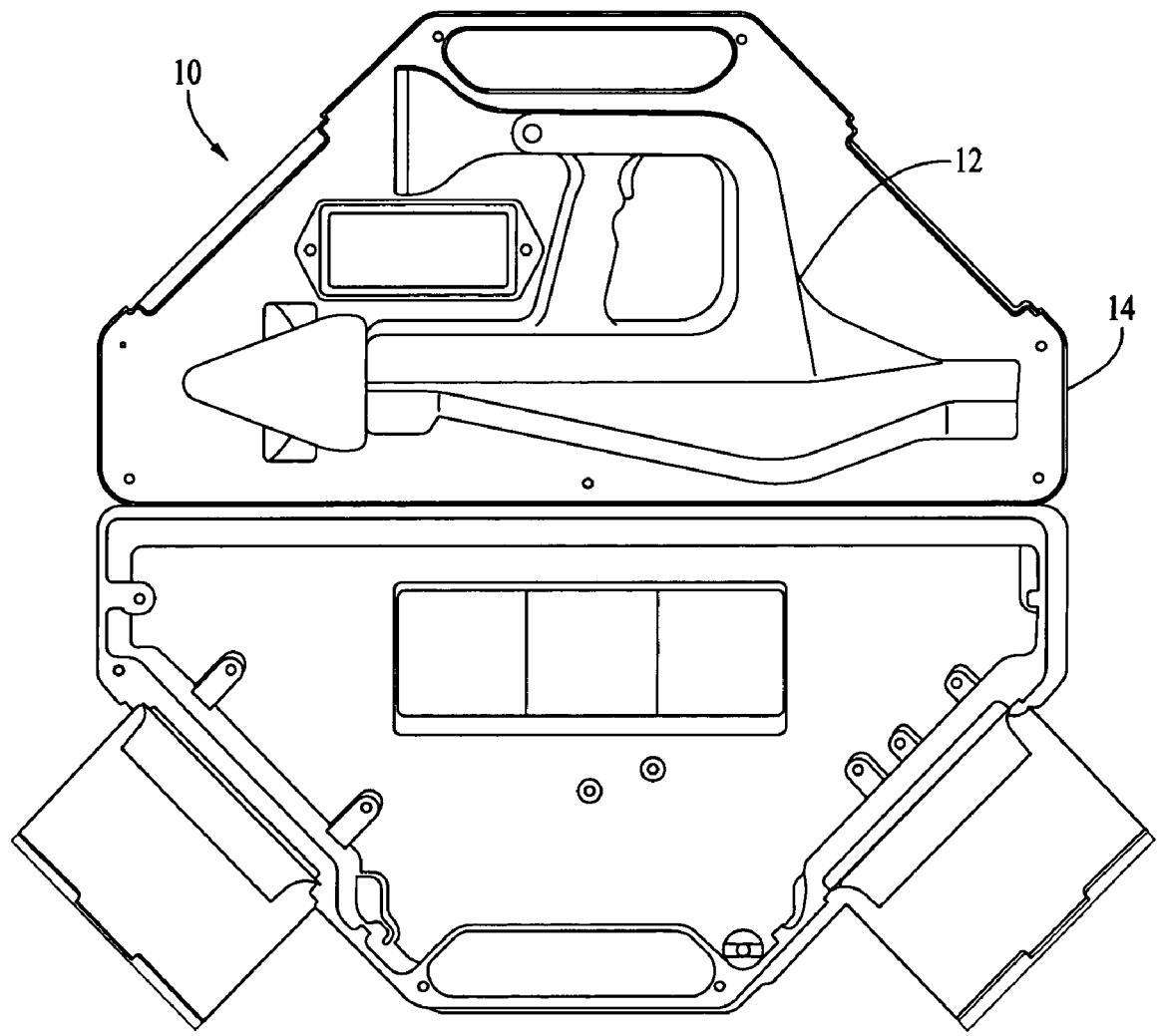
FIG. 1 is a perspective view of the system of the invention.

The invention is a system for identifying the orientation and depth of underground objects, such as lines and sondes. Referring to FIG. 1, the system 10 is comprised of a receiver 12 and a transmitter case 14. A variety of accessories (not shown) can be used in conjunction with the system of the invention.

The preferred embodiment of the receiver 12 is shown in FIG. 2. The receiver 12 has a front end 16 and a rear end 18. The receiver 12 is comprised of a main body 20 and a top arm 22. The main body 20 and the top arm 22 of the locator 12 are integral to each other and the locator 12 is typically made from a single mold. The main body 20 has a top surface 21 and a bottom surface 23. The top arm 22 has a top surface 25 and a bottom surface 27. In the embodiment shown in the drawings, the bottom surface 27 of the top arm 22 and the top surface 21 of the main body 20 together form a U-shaped cavity 29 in the receiver 12.

A handle 24 connects the main body 20 and the top arm 22. The handle 24 is oriented approximately perpendicularly to the main body 20 and to the top arm 22. The handle 24 is shaped to comfortably accommodate a human hand and has a top end 28 and a bottom end 30. The handle 24 is in the general form of a pistol grip. A trigger 26 is positioned proximally to the top end 28 of the handle 24. The handle 24 and the trigger 26 are positioned for comfortable gun-style operation.

In the illustrated embodiment, the receiver 12 contains a display screen 32. The display screen 32 is located on the top arm 22 and is proximal to the rear end 18 of the receiver 12. A typical sharp, high contrast LCD screen can be used as the display screen 32. The display screen 32 provides visual feedback to a user during operation of the receiver 12.

Referring to FIG. 2, the receiver further contains an antenna arm 34. The antenna arm 34 has a first end 40 and a second end 42. The first end 42 of the antenna arm 34 is swivelably connected to the main body 20 of the receiver 12. When receiver 12 is not in use, the antenna arm 34 is typically in a folded position, as shown in FIG. 1. When receiver 12 is operated, the antenna arm 34 is in an unfolded position, as shown in FIG. 2. To move the antenna arm 34 from folded to unfolded position and vice versa, the antenna arm 34 is swung by a user approximately 180° around a swivel point 36. Referring to FIG. 2A, the swivel point 36 is located on the front end 16 of the receiver 12.

Further referring to FIG. 2, the second end 42 of antenna arm 34 contains a pointer antenna 38. The pointer antenna 38 points directly to the object being located, such as an underground line. In the illustrated embodiment, the pointer antenna 38 looks like a rounded arrowhead. A second antenna, called a chassis antenna 39, is housed within the main body 20 of the receiver 12. The chassis antenna 39 is located a predetermined distance away from the pointer antenna 38 along the Z-axis, as shown in FIG. 3. In the preferred embodiment illustrated in FIG. 3, the distance (D) between the pointer antenna 38 and the chassis antenna 39 is 21 inches, but other distances between the antennas can be used, as long as the exact distance is known.

Referring to FIG. 2A, the receiver 12 of the invention measures a magnetic flux field using a total of six directional ferrite-wound loop antennas 41, each antenna 41 having a center tap (ground) and with an equal number of turns on either side of the center tap. In the illustrated embodiment, the antennas 41 are arranged in two sets of three antennas each. One set 43 of three antennas 41 is housed within and makes up the pointer antenna 38. The other set 45 of three antennas 41 is housed within the main body 20 and makes up the chassis antenna 39. The chassis antenna 39 within the main body 20 is enclosed in a chassis antenna cover 39'.

Each set 43, 45 has the antennas 41 arranged as shown in FIG. 3, with the antennas 41 of one set 43 positioned so that they have the same overall orientation in space as the antennas 41 of the other set 45. The antennas 41 are oriented along mutually orthogonal axes, X, Y, Z. Therefore, each antenna is capable of detecting some distinct portion of a 3D magnetic flux field vector.

The goal of having this arrangement is to measure two 3D magnetic flux vectors at two points in space, separated by some predetermined distance. Once these two vectors have been determined, they may be used in various calculations to determine the location of the target that is generating the magnetic field. The magnetic field is typically the result of an AC current flowing either along a straight line (e.g. a cable or a pipe that has been "energized"), or an AC current flowing in a solenoid (an energized coil often referred to as a "sonde" in the underground locating industry).

Referring to FIG. 2A, the receiver 12 further contains a speaker 42. In the illustrated embodiment, the speaker 42 is housed within the top arm 22 of the receiver 12, and is located proximally to the front end 16 of the receiver 12. The speaker 42 provides audible sound feedback to a user during operation. The volume of the speaker can be adjusted by a user, as needed.

Further referring to FIG. 2A, the receiver 12 also contains at least one custom circuit board 47, which contains at least one microcontroller 112 and logic circuitry (not shown). The microcontroller 112 and circuitry of the receiver 12 are designed to interpret the locating signals acquired by the antenna sets 43 and 45, perform calculations with the acquired signals, and produce a result output on the display screen 32. The result output is also preferably audible, and can be heard through the speaker 42 of the receiver 12.

Further referring to FIG. 2, the receiver 12 also contains a battery compartment 44. In the illustrated embodiment, the battery compartment 44 is proximal to the rear end 18 of the receiver 12 and is located on the bottom surface 23 of the main body 20.

In the embodiment illustrated in the drawings, the receiver 12 further contains a connection panel 46, located on the bottom surface 21 of the main body 20, between the battery compartment 44 and the front end 16 of the receiver 12. The connection panel 46 provides plug-in access for various standard and optional accessories (not shown).

The connection panel 46 of the preferred embodiment is illustrated in more detail in FIG. 4. The connection panel 46 contains a headset jack 48 for accommodating a headset plug (not shown). When a headset (not shown) is plugged into the headset jack 48, the receiver 12 transmits sound into the headset and the speaker 42 no longer emits audible sounds. The connection panel 46 further contains an auxiliary antenna port 50. The port 50 allows a user to connect up to two external antennas (not shown) into the receiver 12.

By way of example, a generally available enhanced-sensitivity detection antenna (not shown) and a cable clamp (not shown) may be plugged into the auxiliary antenna port 50. In the illustrated embodiment, the connection panel 46 further contains a small pinpoint aperture 52. The aperture 52 acts as a reset button for the circuitry of the circuit board 47 housed inside of the receiver 12. A small object, such an end of a regular paper clip may be inserted into the aperture 52 to reset the internal circuitry of the receiver 12. The connection panel 46 also contains a communications port 54. The communications port 54 allows the receiver 12 to communicate with external devices (not shown).

Figure 5:
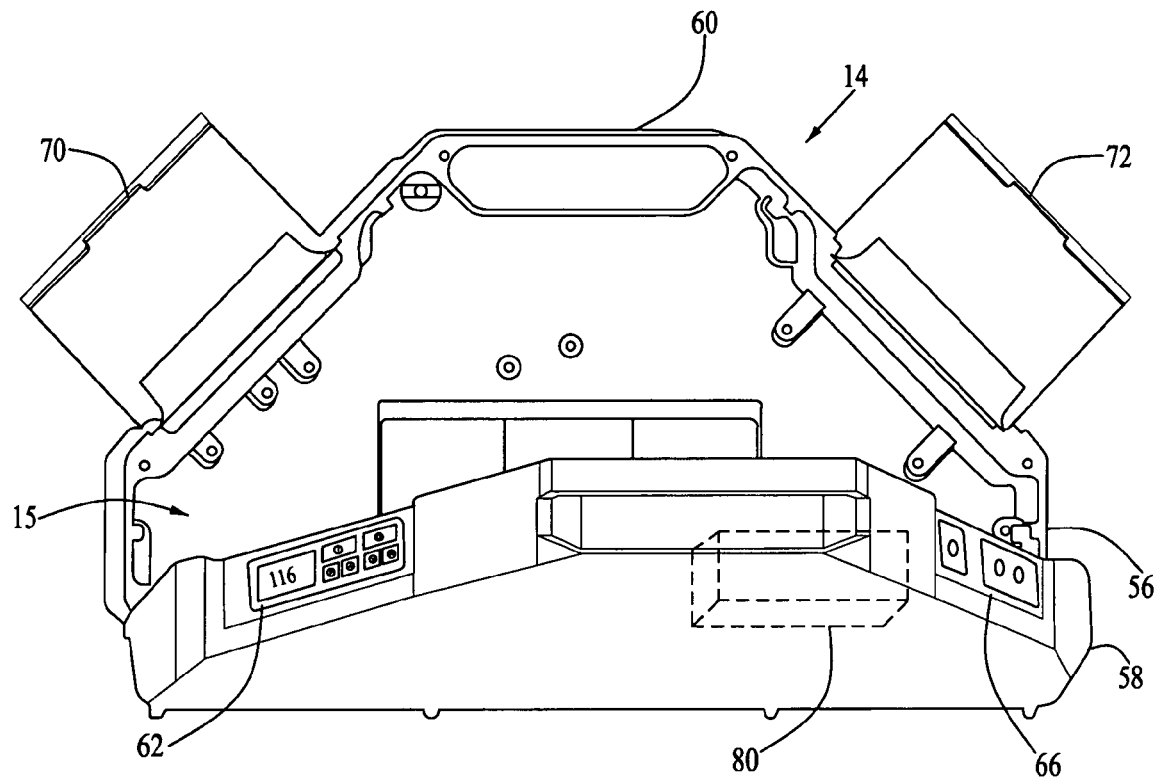
FIG. 5 is a perspective view of the preferred embodiment of the carrying case of the invention.

The second major component of the system of the invention is the transmitter case 14, illustrated in detail in FIG. 5. One of the functions of the transmitter case 14 is to house the receiver 12. The inside of the case 14 includes a cavity 15 that is shaped to accommodate the receiver 12. The case 14 also includes a built in line-energizing transmitter (not shown). A Model 23X transmitter offered by Goldak, Inc. of Glendale, Calif. is compatible with the transmitter case 14.

In the embodiment illustrated in the drawings, the case 14 is generally trapezoidal in shape and is made out of two halves, the top half 56 and the bottom half 58. Alternatively, any other suitable shape may be used. The case 14 contains a handle 60, designed to accommodate the hand of a user. The handle 60 makes the carrying of the case more convenient. In the illustrated embodiment, the bottom half 58 of the case 14 contains a control panel 62 on one side 64 and an output panel 66 on its other side 68. The control panel 62 contains a plurality of buttons and is used to operate the transmitter.

In the illustrated embodiment, the transmitter case 14 also contains two latch covers—a left cover, 70, and a right cover 72. The latch covers 70, 72 secure the case 14 when it is in a closed position (not shown). When the case 14 in the closed position, the left latch cover 70 is positioned over the control panel 62, and the right latch cover 72 is positioned over the output panel 66.

Figure 6:
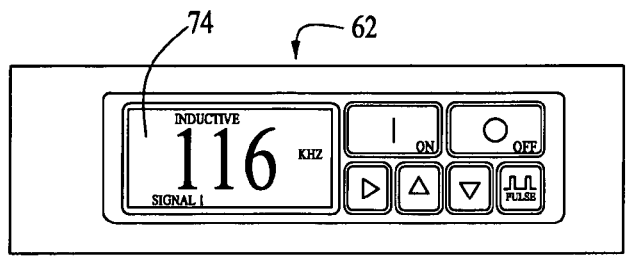
FIG. 6 is a close-up perspective view of the control panel of the carrying case of the invention.

The control panel 62, illustrated in more detail in FIG. 6, comprises a display 74 that reports information regarding the operation of the transmitter, such as mode, frequency, output level, etc. An LCD display is typically used, but other display types are acceptable. The control panel 62 comprises the following buttons: "ON", "OFF", "Select", "Up", "Down", "PULSE". These buttons allow a user to operate the transmitter.

Figure 7:
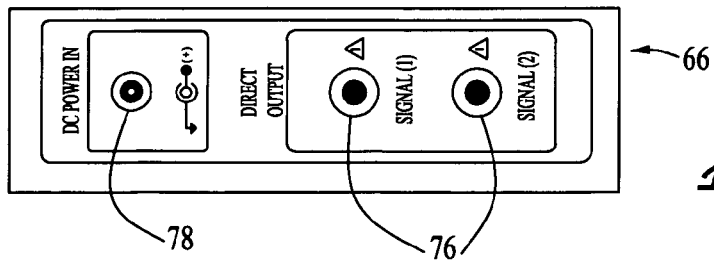
FIG. 7 is a close-up perspective view of the output panel of the carrying case of the invention.

The output panel 66, illustrated in FIG. 7, comprises three jacks, which are normally used for signal output and power input. Specifically, the output panel 66 contains two "Direct Output" jacks 76, a "Signal (1)" jack and a "Signal (2)" jack. Each of the "Direct Output" jacks is made to accommodate a standard ¼" mono phone plug (not shown). An example of such a phone plug is the direct connection cable 82, which is shown in FIG. 8.

Preferably, the "Signal (1)" jack is configured to output twice the standard signal level, when used alone. When the two "Direct Output" jacks 76 are used together, each jack outputs a standard signal level. The output panel 66 further contains a "DC Power In" input 78. This input 78 is configured to accommodate a standard 2.5 mm DC power plug, which is commonly available. The input works best when the rated voltage of the external supply is between 7.5V and 25V.

Referring once more to FIG. 5, the transmitter case 14 further contains a battery compartment 80. In the illustrated embodiment, the battery compartment 80 is housed within the bottom half 58 and is located proximal to the handle 60 of the transmitter case 14.

Figure 8:
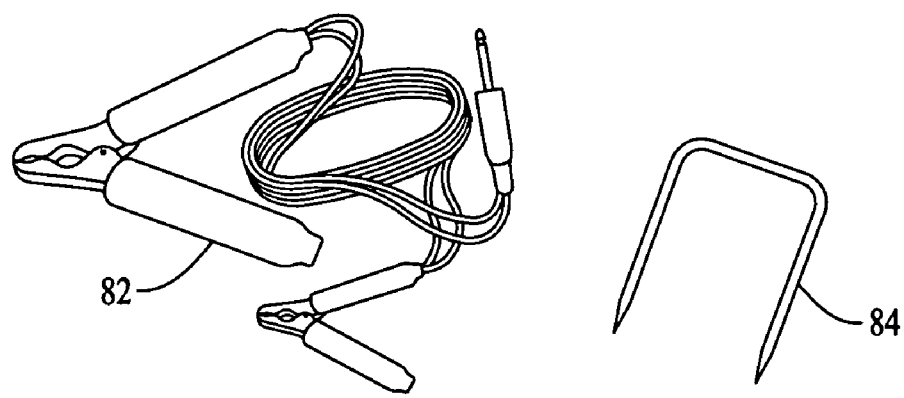
FIG. 8 is a perspective view of the attachments used in conjunction with the carrying case in another embodiment of the invention.

In one embodiment, the system of the invention further comprises a direct connection cable 82 and a ground rod 84, shown in FIG. 8, both of which are typically housed within the transmitter case 14. The direct connection cable 82 is used to inject a signal directly into a target line. The ground rod 84 is usable to establish good grounding for direct connection to an underground line 100.

To operate the system of the invention, a user unlocks the two latch covers 70, 72, opens the transmitter case 14 and removes the receiver 12. When the receiver 12 is removed from the case 14, the receiver 12 is in its folded configuration. To switch receiver 12 to its unfolded configuration, the antenna arm 34 is swung in a clockwise direction 180° about the swivel point 36 until the antenna arm 34 is fully extended.

Figure 9:
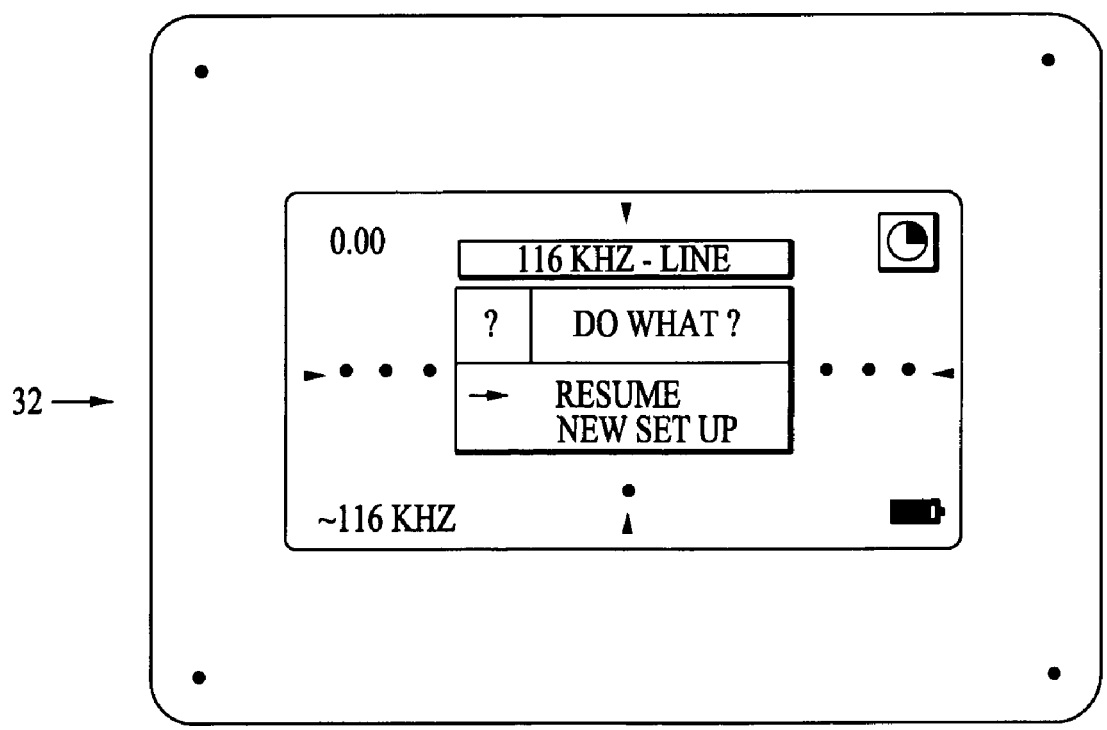
FIG. 9 is a close-up perspective view of the display screen of the locating receiver of the invention.

To turn on the receiver 12, the trigger 26 is clicked once. When the receiver 12 is turned on, the display screen 32 will display information, as shown by way of example in FIG. 9. The information displayed on the display screen 32 is in the form of a menu. The user can use the menu-style information shown by the display 32 to select options for operation of the receiver 12. The trigger 26 is used to scroll between and select the menu choices. In the preferred embodiment, for example, the trigger 26 is clicked and released once to scroll between the menu choices. In order to select a highlighted menu choice, the trigger 26 is clicked and held for approximately 1-3 seconds.

Before an underground line can be located, it must carry a current at the frequency of interest. A line that carries a tracing current is an energized line. The system of the invention not only allows a user to trace a line that is already energized with current, but also allows the user to use several methods of introducing a current into a line.

Figure 14:
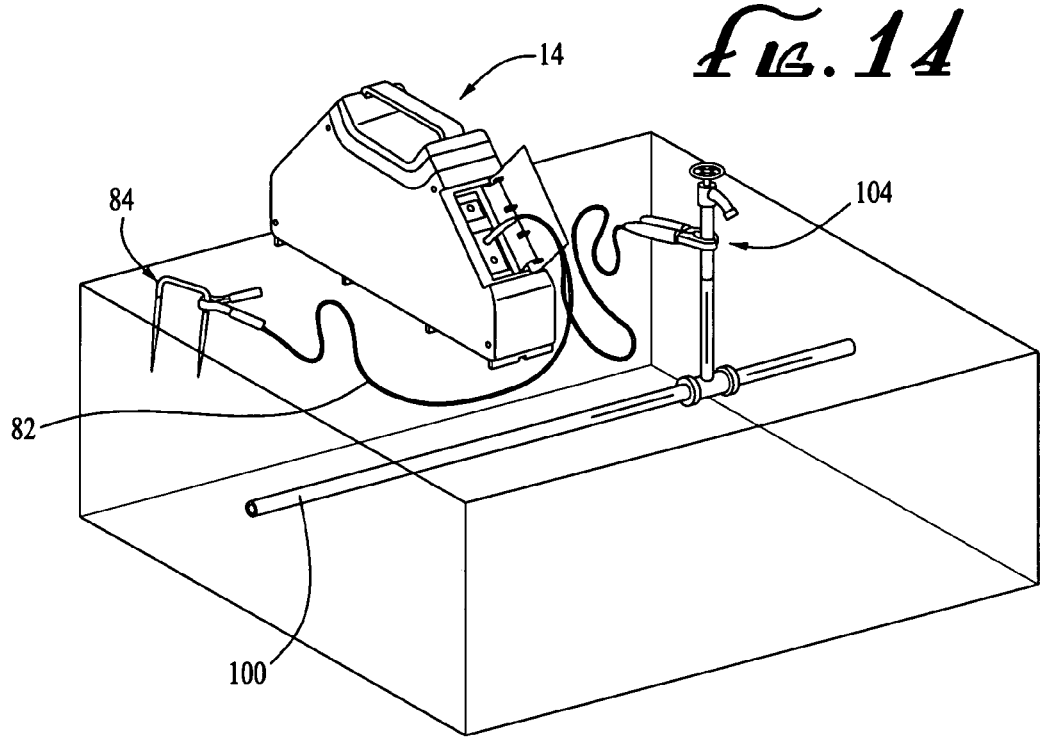
FIG. 14 is a perspective view of the direct connection method of energizing a line using the system of the invention.

In the embodiment illustrated in FIG. 14, the line 100 is energized via direct connection in which a signal is injected from the active transmitter output 76 of the transmitter case 14 into the line 100 using the direct connection cable 82. To energize the line 100 by direct hookup, a user needs an accessible electrically exposed part of the line 100 to which to connect the connection cable 82. This could be a metallic water riser or the bare end of a tracer wire, for example.

Figure 15:
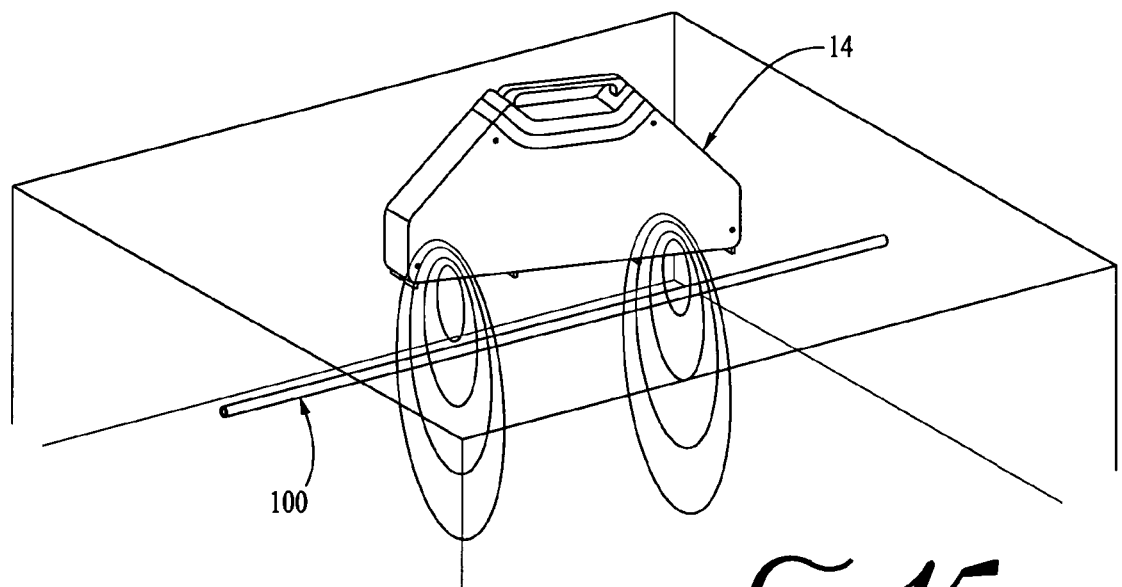
FIG. 15 is a perspective view of the induction method of energizing a line using the system of the invention.

In another embodiment of the invention shown in FIG. 15, the line 100 can be energized by induction. Referring to FIG. 15, when the signal jacks 76 of the transmitter case 14 are not being used, the transmitter case 14 emits an inductive field, which is capable of energizing an underground line 100 when placed over it. This method requires none of the underground line to be exposed. However, this method is best used on isolated lines and away from areas congested with many other lines and metallic objects.

Some lines are by their nature always energized. An example of such a line would be a power line. Currently used power lines that are actively in service constantly carry AC current. This current is typically at a frequency of 60 Hz with harmonic components at multiples of 60 Hz (i.e., 120 Hz, 180 Hz, 240 Hz etc.). In Europe this frequency is 50 Hz (100 Hz, 150 Hz, etc.). With such lines, the step of energizing the line is not necessary.

Once the target underground line 100 has been energized, the operator (not shown) is ready to use the receiver 12 to trace the line 100 and identify its orientation and depth.

As discussed earlier, the display 32 of the receiver 12 provides operation-related information to a user in menu-style format. Scrolling between the choices and selection of choices is achieved by operation of the trigger 26. The menu-style software of the receiver 12 provides a user with three different ways to set the locating frequency of the receiver 12. The user can use a "BYSCAN" option in the menu, which automatically tunes the receiver 12 to the exact frequency of the transmitting source. Also, the user could use a "BYCATALOG" option in the menu, which allows the user to choose the desired receiver frequency manually from a list of pre-catalogued selections. Also, the user could use a passive mode option in the menu, which scans at the frequency of 60 Hz.

Prior to initiating line locating, the user sets the locating mode using the menu on the display screen 32. In the preferred embodiment of the invention, there are four modes available: Line, Sonde, Peak and Null. The Peak and Null modes are conventional and are well-known in the art.

Figure 10:
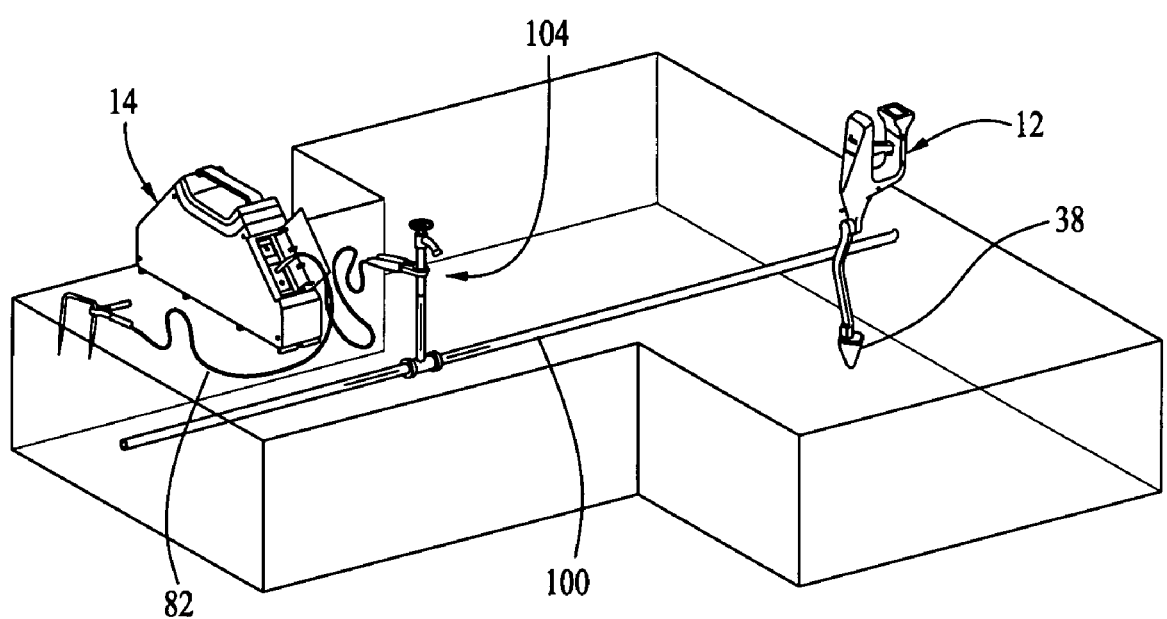
FIG. 10 is a perspective view of the typical operation of the system of the invention.

The Line mode, generally shown in FIG. 10, is unique to the locator of the invention. If this mode is selected, a graphic representation of the target line is displayed on the display screen 32 while the underground line 100 is being traced. This mode is fully automatic, requiring no user intervention after setup. This mode displays line position and direction, and automatically calculates the depth and depth accuracy when the pointer antenna is positioned over the buried line. A sample output of the display screen 32 during the Line mode is shown in FIGS. 11A, 11B, and 11C.

Referring, to FIG. 10, to begin the searching of line 100, a user walks with the locator 12 in hand away from the hookup point 104, at which the transmitter case 14 connects to the line 100. Once the user is several feet from the hookup point 104, the user typically walks around the hookup point 104 in a circular direction. When the pointer antenna 38 crosses over the line 100, the speaker 42 of the receiver 12 will notify the user by making a distinct sound.

Referring to FIG. 11A, while searching for line 100 with the receiver 12 in hand, the user is guided by the audible signal generated through the speaker 42 of the receiver 12, and by the arrow 86 on the display screen 32 that indicates the direction from which the signal generated by the line 100 is coming. In FIG. 11A, the display screen 32 is shown at a time when a user approaches an energized line 100. The screen 32 displays an arrow 86. The circle 88 with a cross-hair 89 in the middle represents the pointer antenna 38 of the receiver 12. The arrow 86 indicates the direction from which the signal is coming. For instance, in FIG. 11A, the energized underground line 100 is to the right of the pointer antenna 38.

Referring to FIG. 11B, as the user moves closer to the underground line 100, a digital image 101 of the line is projected on the screen 32, indicating the orientation of the line 100 with respect to the pointer antenna 38 of the receiver 12.

Referring to FIG. 11C, once the line image 101 is centered under the crosshairs 89 inside of the circle 88, the depth reading 98 of the line will appear in the upper right corner of the screen 32. As the depth reading 98 is displayed, depth accuracy reading 97 also appears on the screen 32. The strength of the signal coming from the line 100 is represented in the upper left corner of the display screen 32 by signal strength reading 99.

There are many instances when a user needs to locate and trace a line that is not capable of carrying electric current. This kind of line is referred to as "nonconductive". In the case of nonconductive lines, the user typically inserts a small transmitter that creates a locating field only around its own position. Such a transmitter is referred in the art as a "sonde." Most often sondes are inserted inside a nonmetallic line or conduit in order to find specific locations of points within the line.

The receiver 12 of the invention employs a unique technology to determine the location of a sonde. The sonde mode is generally shown in operation in FIG. 13. This technology allows the user to know immediately the location depth and orientation of the sonde and the technique is not limited by unusual or unanticipated orientations of the sonde.

The sonde to be used needs to be activated. Typically, a battery is inserted into the sonde to activate it. Next, the receiver 12 is tuned to the frequency of the sonde 102. To tune the receiver 12 to the sonde 102, the user sets the frequency of the receiver 12 to that of the sonde 102 by using either the "BYSCAN" or the "BY CATALOG" in the menu, as explained above. Preferably, the scanning feature is to be used, as it enables the user to use and locate a sonde even if its frequency is unknown. Once the frequency of the receiver 12 is set, the Sonde Mode is selected from the menu, by using the trigger 26 as explained above.

The next step is to feed the sonde 102 into the underground pipe/conduit using techniques well known in the art. Once the sonde 102 is fed into the underground line, the user can begin locating the sonde using the Sonde locating mode of the invention.

The sonde mode, illustrated in FIGS. 13 and FIGS. 12A, 12B, 12C, is unique to the receiver 12 of the invention. This mode aids the user in locating a sonde 102 by displaying a graphic icon representation of its orientation and relative position.

Referring to FIG. 12A, as the user approaches the sonde 102, the display screen 32 of the receiver 12 will present an arrow icon 86, which indicates the direction from which the signal is coming. As the user approaches the sonde, 102, the receiver 12 will emit an audible sound through the speaker 42, and the sound will gradually increase in pitch as the user gets closer to the sonde 102.

Referring to FIG. 12B, as the user moves closer to the sonde 102, the screen 32 will display a sonde icon 103, indicating its location and orientation of the sonde 102 with respect to the center cross-hair 94.

Referring to FIG. 12C, as the receiver 12 homes in on the sonde 102, the centering circle 88 constricts about the sonde icon 103. When the circle 88 fully constricts about the sonde icon 103, and the pointer antenna 38 of the receiver 12 points directly at the sonde 102, the approximate depth of the sonde 102 will be displayed by an icon 98 in the upper right corner of the display screen 32, and the actual orientation of the sonde 102 will be evident from the sonde icon 103. As in the line mode, the strength of the signal coming from the sonde 102 is represented in the upper left corner of the display screen 32 by icon 99 and the accuracy of the depth prediction is indicated by icon 97 in the upper right corner.

A novel method of measuring of flux field vectors is also provided by the invention. The receiver 12 of the invention employs a novel method of translating the flux field emitted by the underground object of interest into a digital projection of the underground object on the display screen 32.

As explained above, the AC magnetic flux emitted by an underground line or a sonde is measured using a total of six directional ferrite-wound loop antennas 41. A ferrite-wound antenna is simply a variation of a type of antenna more generally known as a "loop". A loop is so called because it is usually a wire that is formed into some closed shape, typically a circle. A loop can have multiple iterations or winds, and a ferrite wound antenna is a loop having a multitude of winds.

Typically, the loop has the distinct feature of being directional, meaning that it has a single axis along which it is most receptive. The axis perpendicular or orthogonal to the first axis is not receptive at all, and is referred to as the "null" direction. So, in a set of three, as described herein, each antenna 41 responds to a component of the actual field vector.

Because the three antennas 41 are mutually orthogonal, the field detected by each can be summed using vector math to get a single, 3D resultant. The circuitry of the receiver 12 is responsible for performing the mathematical calculations. The three antennas 41 of the pointer antenna 38 and the three antennas 41 of the chassis antenna 39 are all connected to a network of analog switching circuitry.

Referring to FIG. 16, the pointer antenna 38 and the chassis antenna 39 are connected to an analog multiplier 118, which is in turn controlled by a microcontroller 112. The microcontroller 112 responds to signals from the trigger circuitry 144, which is the intermediate between the trigger 26 and the microcontroller 112. The low-level voltage responses of the individual antennas 41 of the pointer antenna 38 and the chassis antenna 39 to the flux field coming from the underground object of interest are then immediately combined through a summing amplifier 120 and a difference amplifier 122.

Referring further to FIG. 16, and by way of example, the response signal from the pointer antenna 38 is called the "reference" (R or r), and the response from the second antenna is called the "test" (T or t). The signal that emerges from the summing amplifier 120 is G(R+T), where G is some known gain value, and is called the "sum".

The signal that emerges from the difference amplifier 122 is G(R−T), and is called the "difference". Having been combined at this low level, the sum and difference signals are then passed through matching signal processing paths illustrated in FIG. 16. By way of example, the travel paths of the sum signal (R+T) and the difference signal (R−T) are now described in more detail.

The processing paths of the sum and the difference signal through the circuitry of the receiver 12 involve the following intermediary steps. First, the signals pass through matched digital gain 124, 126. The signals then travel through matched analog mixers/filters 128, 130. Subsequently, the signals go through auxiliary matched DSP filters 132, 134 and through matched audio filters 136, 138.

The matched circuitry simultaneously applies an absolute value function 140, 142, rendering |R+T| for the sum signal and |R−T| for the difference signal. These results are then integrated by integrators 144, 146 over a predetermined time period. Special methods are applied during integration to reduce and/or nullify processing errors.

The integrated results are then digitized to produce two numerical results, $S=\int|R+T|$, and $D=\int|R-T|$. The signals then pass through converters 148, 150, after which the signals travel to the microcontroller 112. The microcontroller relays the signals incoming from the processing paths into a video output 114 on the Graphic LCD screen 32 and into an audio output 116 through the speaker 42 of the receiver 12. The above-described processing paths essentially amplify and filter the signals under the control of the microcontroller 112 to produce back-end sum and back-end difference results.

The general method of arriving at a 3D vector measurement for an antenna set involves mathematical processing of multiple measurement pairs (S and D) together, which are generated by the circuitry as described above. Mathematically, several methods are provided by the present invention to arrive at usable results using mathematical calculations, depending on how antennas are switched and combined. Generally, each method relies on the ability of the circuitry of the receiver 12 to measure flux field strength using switched pairs of antennas in rapid succession. The microcontroller 112 is responsible for controlling the sequencing and duration of the measurements. Because the circuitry of the present invention provides matches signal processing paths, the S and D measurements occur simultaneously.

The preferred method of calculating flux field vectors using the three-antenna sets 43, 45 of the receiver 12 involves sequential measuring of the responses of the individual antennas 41 to the flux field emitted by the underground object. By way of example, the responses to the flux field of each of the three antennas 41 in the antenna set 43 of the pointer antenna 38 are called X, Y, and Z.

The microcontroller 112 sets the reference (R) and the test (T) to the same antenna (R=X and T=X), and makes the S and D measurements as described previously. Subsequently, the microcontroller 112 sets R=Y and T=Y, and makes the next set of S and D measurements. Finally, the microcontroller 112 sets R=Z and T=Z and makes the final S and D measurements. The microcontroller 112 can reiterate this sequence ad infinitum.

Mathematically, the measurement set is obtained in a total of three measurement cycles, and it looks like this:

Cycle 1: $(R=T=X) \rightarrow S1=|X+X|$ and $D1=|X-X|=0$

Cycle 2: $(R=T=Y) \rightarrow S2=|Y+Y|$ and $D2=|Y-Y|$

Cycle 3: $(R=T=Z) \rightarrow S3=|Z+Z|$ and $D3=|Z-Z|$

If this simple approach is used, X, Y, and Z are obtained from S1, S2, and S3. Actually, only the magnitudes of the three responses can be obtained using this approach:

| |X| = S1/2 | |Y| = S2/2 | |Z| = S3/2 |
| --- | --- | --- |

The above example illustrates how three successive sets of simultaneous sum and difference measurements can be used to define a three-dimensional flux response vector.

To fully define the measured flux vector, phase information must also be obtained. To do this, the microcontroller 112 pairs the antennas 41 in a staggered sequence, so that information can be inferred about the phase of each response with respect to the others. The preferred method of sequential pairing is:

Cycle 1: $(R=X, T=Y) \rightarrow S1=|X+Y|$ and $D1=|X-Y|$

Cycle 2: $(R=Y, T=Z) \rightarrow S2=|Y+Z|$ and $D2=|Y-Z|$

Cycle 3: $(R=Z, T=X) \rightarrow S3=|Z+X|$ and $D3=|Z-X|$

From these six measurement results, a complete flux response vector can be calculated, including magnitude and sign (phase) of the three orthogonal components X, Y, and Z.

The preferred method of the invention provides several ways of using the six measurements to get the correct vector result. As example, one way of calculating X and Y from S1 and D1 is illustrated below:

If it is known that X>Y>0, then $S1=|X+Y|=X+Y$, and $D1=|X-Y|=X|Y$. Therefore:

$$S1+D1=X+Y+X-Y=2X \text{ and}$$

$$S1-D1=X+Y-(X-Y)=2Y$$

Generally, it can be shown that, $$\max(|X|, |Y|) = S1 + D1 \text{ and } \min(|X|, |Y|) = |S1 - D1|$$

Thus, the magnitudes of X and Y are obtained. The magnitude of the larger of X and Y is assigned to the sum of S1 and D1. The magnitude of the smaller is assigned the absolute value of the difference of S1 and D1.

The magnitudes cannot be assigned unless the larger and the smaller of X and Y is first determined. To accomplish this, the microcontroller 112 compares all six measurements of {S1, S2, S3, D1, D2, D3} in order to rank the three vector components, X, Y, and Z. From the largest measurement, the microcontroller 112 deduces the top two ranked components, and hence the 3rd-ranked. From the values of other measurements, the microcontroller 112 then deduces the top ranked component. The remaining component is the 2nd-ranked one.

To obtain the relative signs of X and Y (phase), S1 and D1 are compared to each other:

if $S1 > D1$, then $\text{sign}(X) = \text{sign}(Y)$ (i.e., components share same polarity or phase)

if $S1 < D1$, then $\text{sign}(X) = -\text{sign}(Y)$ (i.e., components have opposite polarity)

The final signed values of X and Y are obtained by first determining the overall significance ranking of X, Y, and Z. Then, the magnitude of each component is determined, for example, by summing and differencing S and D pairs. Then, the relative signs of components are determined by comparing S and D from the appropriate measurement pairs.

The invention also provides another method that can be used to obtain magnitude and phase relationships of the three vector components (X, Y, and Z). The mathematical calculations of this method are provided below:

$(R=M, T=X) \rightarrow S1 = |M+X|$ and $D1 = |M-X|$  Cycle 1:

$(R=M, T=Y) \rightarrow S2 = |M+Y|$ and $D2 = |M-Y|$  Cycle 2:

$(R=M, T=Z) \rightarrow S3 = |M+Z|$ and $D3 = |M-Z|$  Cycle 3:

In this method of sequencing, M is a member of the set {X, Y, Z} and is assumed to be the maximally responding antenna of the three. If it is supposed that M=X, then:

| | |
|---|---|
| S1 = \|X + X\| = 2\|X\| | D1 = \|X − X\| = 0 |
| S2 = \|X + Y\| | D2 = \|X − Y\| |
| S3 = \|X + Z\| | D3 = \|X − Z\| |

This approach, "maximally-responding method" is very similar to the staggered-sequence method described above. The difference between this and the staggered-sequence method is that the reference antenna (R) does not change during the three cycles. The advantage to this approach is that the magnitude of the reference antenna response is always equal to S1. Therefore, S1 (with S2, D2, S3, and D3) can be used to easily obtain the magnitude and polarity of the two remaining antennas (i.e., the non-reference or "test" (T) antennas).

To obtain X and Y from the above measurements the following calculations are performed:

$X = |X| = S1/2$, where $X$ is assumed to be always positive $Y = (2*S2 - S1)/2 = (2*|X+Y| - 2|X|)/2$ or $Y = (S1 - 2*D2)/2 = (2|X| - 2*|X-Y|)/2$ If Y<0, then this is reflected in the above calculations as well. Thus, the magnitude and polarity of Y with respect to X are obtained. Z is calculated in similar manner to X and Y. From the above calculations, the microcontroller 112 can deduce the maximally-responding antenna, even if it was not selected to be the reference antenna R for the most recent cycles. The microcontroller 112 can then set M accordingly for the subsequent cycles.

Because of the flux field processing by the antennas and the circuitry of the receiver 12, the receiver 12 is capable of identifying the location of a transmitting target with a span of 360° around the receiver. As mentioned above, the processing of the multiple antenna responses enables the calculation of two 3D vectors, a Vp vector 108 associated with the pointer antenna 38, and a Vc vector 106 associated with the chassis antenna 39. How these vectors are interpreted depends on whether the target in question is an underground line 100 or a sonde 102.

The invention herein also provides a method of converting the flux field vector measurements into a graphical representation of a sonde on the display screen 32 of the receiver 12. This method is generally shown in operation in FIGS. 17C and 17D.

If the target is a sonde, the magnetic field associated with an AC current flowing in the coil is toroidal in shape. Because the dipole field is more complex in its properties, the math required to determine the relative location of a sonde using the pointer and chassis vectors is also more complicated compared to that required for a current-carrying line. The 3D nature of the two determined vectors 106, 108 enable in an analogous way (compared to a current-carrying line) the translation to the 2D location on the display screen 32, which displays a graphic icon 103 to represent the relative location of the sonde 102 in space.

The mathematical processing used to translate the results of the $V_P$ vector 108 of the pointer antenna 38 and the $V_C$ vector 106 of the chassis antenna into a representation of the location and orientation of the sonde in space is explained below. The inventor herein has found that the classic dipole field has properties that may be exploited to determine the center of the source of the field. Such a field source is classically known as a solenoid.

One of the properties of the solenoid field pertains to the relative directions of each of a pair of vectors that are located a predetermined distance apart along a straight line (ray) that emanates from the center of the solenoid. The inventor herein determined that all field vectors along this ray have the exact same direction. Essentially, the vectors share the exact same "unit vector", although they differ in overall magnitude.

Furthermore, the inventor has determined that the magnitude of the flux vector B along this ray varies as the inverse of the cube of the distance away from the center along this ray. Furthermore, the inventor has found that if the two measurement points in space around the solenoid are not aligned along a ray that emanates from the center, then the unit vectors at these two points are not aligned either. The degree of their misalignment can be determined and used to calculate the location of the solenoid relative to the line of the, two points at which the vectors were determined.

The receiver 12 of the invention uses two key quantities to identify the location and orientation of the sonde in space: (1) the unit vector cross product of the pointer antenna vector Vp and the chassis antenna vector Vc; and (2) the "vector gain" of the $V_P$ and the $V_C$ vectors.

To calculate the degree of vector misalignment, first the two measured vectors $V_C$ and $V_P$ are unitized and converted to vectors that each has a magnitude of 1. A third vector $V_{CROSS}$ is calculated using the vector cross product of the two unit vectors $V_P$ and $V_P$. Thus, $V_{CROSS}=V_P \times V_P$. Once $V_{CROSS}$ is obtained, it is used to determine the approximate direction from which the dipole field originates.

$V_{CROSS}$ can be re-written as follows:

$$V_{CROSS}=|V_P|*|V_C|*(V_{PU} \times V_{CU})$$

in which the "U" subscript refers to the unit vector associated with the original vector from which it is derived. The unit vector, of course, always has a magnitude of 1. So, dividing the above equation by $|V_P|$ and by $|V_C|$, the unit cross product of $V_P$ and $V_C$ is deduced:

$$V_{CROSS\_U}=V_{CROSS}/(|V_P|*|V_C|)=V_{PU} \times V_{CU}$$

The unit cross product $V_{CROSS\_U}$ has a magnitude that varies from 0 to 1, and has the exact same direction as $V_{CROSS}$. By the rules of vector math, if $V_{CROSS\_U}=0$ then $V_P$ and $V_C$ share the exact same line of direction. If $V_{CROSS\_U}=\pm 1$, then $V_P$ and $V_C$ are orthogonal, having an angle of 90° between them.

The cross-product $V_{CROSS}$ itself is a 3D vector whose components can be used to map a virtual location of the dipole source on the screen 32 of the receiver 12. Also, the magnitude of $V_{CROSS}$ reveals the degree of misalignment of the original measurement vectors. This degree is expressed in a number that ranges from 0 to 1, since the argument vectors themselves range from 0 to 1 in magnitude.

The magnitude of $V_{CROSS}$ alone does not suffice to determine where on the 2D screen 32 the sonde icon 103 will appear. The reason is that the degree of misalignment of the measurement vectors also depends on the distance that the measurement points are away from the dipole source. The further away the measurement points, the more aligned the unit vectors $V_P$ and $V_C$ will become. This means that the divergence of the flux field decreases as the distance away from the dipole source increases.

To account for this, the circuitry of the receiver 12 calculates a factor called the "vector gain." The vector gain $G_V$ is the ratio of the magnitude of the measured pointer vector to the magnitude of the measured chassis vector. Thus, $G_V=|V_P|/|V_C|$. The gain value represents the intensity of the magnetic flux at the location of the pointer antenna set 43 compared to that at the location of the chassis antenna set 45.

From $V_{CROSS\_U}$ and $G_V$, the microcontroller 112 derives another factor, herein called Epsilon (E). In general, E is given by the equation, $$E=|V_{CROSS\_U}|/f(G_V)$$

where $f(G_V)$ is a function of the vector gain that typically increases as $G_V$ increases and decreases as $G_V$ decreases. The numerator is the magnitude of the unit cross product, and it varies from 0 to +1.

In the preferred embodiment of the receiver 12 of the invention, $$f(G_V)=[G_V-1]^{(1/2)}$$

However, this function, $f(G_V)$, can be defined a number of different ways in order to adjust the overall response characteristic. The purpose of $f(G_V)$ is to scale E to account for varying divergence in the magnetic flux field as the distance between the receiver and the sonde increases. The further away the receiver is from the sonde, the smaller the divergence of the flux field. Function $f(G_V)$ counter-balances this effect.

In calculating E, the goal is to arrive at a single real scalar number that typically ranges from 0 to +1, and that approximately indicates the angle between two lines. Namely, the two lines in question are: (1) the line that radiates from the center of the sonde 102 to the center of the chassis antenna set 45; and (2) the line that may be drawn from the center of the chassis antenna set 45 to the center of the pointer antenna set 43. Line (2) also happens to be the Z-axis of both the chassis and pointer antennas.

To translate the location results to the display screen 32, the microcontroller 112 of the locator 12 uses the scalar number E and vector $V_{CROSS\_U}$ to interpret where in external 3D space the sonde 102 is located relative to the coordinate system of the receiver 12. Referring to FIG. 12B, this interpretation is drawn on the display screen 32, representing the sonde 102 by a 2D projection 103 of a 3D cylinder, relative to a centering crosshair 89.

Because $V_{CROSS\_U}$ is a vector cross product, its direction is by definition orthogonal to the plane formed by the argument vectors. Therefore, $V_{CROSS\_U}$ must be appropriately transformed to be useful in the coordinate space of the receiver 12. In particular, $V_{CROSS\_U}$ must be transformed to the virtual coordinate space of the display screen 32. The following equations perform this transformation:

$$X_{SCR}=(Y_{VCU}*e*K_{SCR})/(X_{VCU}^2+Y_{VCU}^2)^{(1/2)}$$

$$Y_{SCR}=(-X_{VCU}*e*K_{SCR})/(X_{VCU}^2+Y_{VCU}^2)^{(1/2)}$$

where ($X_{SCR}$, $Y_{SCR}$) are 2D Cartesian coordinates on the display screen, $K_{SCR}$=a scaling constant, and $X_{VCU}$ and $Y_{VCU}$ are coordinates of $V_{CROSS\_U}$.

In sum, the locator 12 of the invention is able to calculate the location of a sonde in space by processing the following information: (1) the pointer and chassis vectors, (2) the unit vector cross-product (magnitude and orientation), and (3) the vector gain. This information is combined into an equation that renders a reasonably linear relationship between the measured/processed data and the angle between the line drawn between the two measurement points and the line drawn to the center of the dipole source from the chassis measurement point. This angle can then be used to determine where on the virtual 2D screen that the icon should be located.

Because the two measurement vectors have the exact same alignment when the two measurement points form a line passing through the center of the solenoid, their unit vector cross product in this state has a magnitude of zero. This is a special case of what has been described in the previous paragraph. In this special case, of course, the calculated angle is zero. This means that the sonde icon 103 will be drawn right at the origin, i.e., under the cross hair 89 of the display screen 32. Thus, the user of the receiver 12 can perceive intuitively that the pointer antenna 38 is pointing directly at the sonde 102, regardless of its orientation.

The orientation of the sonde that is reflected on the display screen 32 of the receiver 12 is computed internally based primarily on the pointer vector measurement, and may or may not be adjusted according to the vector cross product result discussed above.

The invention herein also provides a method of converting the flux field vector measurements into a graphical representation of an underground line 100 on the display screen 32 of the receiver 12. This method is generally shown in operation in FIGS. 17A and 17B.

If the target is a line 100, the magnetic field associated with an AC current flowing along the line is cylindrical, with the axis of the cylinder being the current carrying line itself. Specifically, "cylindrical" refers to the shape of the equipotential flux field surrounding the line. The magnitude of the flux vector B varies as 1/r, where r is the perpendicular distance from the line.

Consequently, in a plane with a normal vector parallel to the current-carrying line, every point along a circle with radius r will have the same flux magnitude. Also, at every point along this circle, the magnetic flux vector B will be directed tangentially to the circle. Therefore, the direction of the flux vector at any given pair of points separated by a known distance can be read and mapped mathematically to render a virtual location that can be reported on the display screen 32 of the receiver 12.

The determined vectors can be used to calculate line location, direction of travel, and depth. Because the calculated pointer vector $V_P$ 108 and chassis vector $V_C$ 106 are "true" 3D representations, the indicator arrow 86 and/or line graphic 101 can be drawn correspondingly in all four quadrants of the display screen 32 (a 360° range).

The method of translating a representation of a line 100 onto the display screen 32 is now described in more technical detail. As in the case of sonde locating, the receiver 12 of the invention uses $V_P$ and $V_C$ to determine line location relative to the receiver 12.

As shown in FIGS. 17A and 17B, $V_P$ and $V_C$ represent the flux vector measurements at two points in a cylindrical magnetic flux field. As illustrated in FIG. 17A, $V_P$ and $V_C$ are misaligned when the Z-axis of the receiver is pointing away from the center of the current-carrying line. As the pointer is swung about the chassis toward the energized line, $V_P$ and $V_C$ become aligned as shown in FIG. 17B, so that, $$|V_P \times V_C| = |V_{CROSS}| = 0$$

Thus, again, $V_{CROSS}$ vanishes when the virtual line radiating from the center of the energized line 100 is aligned with the Z-axis of the receiver 12. The mathematic processing involved in making appropriate calculations is similar to that given for sonde locating earlier. The differences are found in how $f(G_V)$ is defined and in how E and $V_{CROSS\_U}$ are transformed to generate the display screen 32 coordinates and directions.

The preferred method for using $V_P$ and $V_C$ to locate the underground line 100 is to compare $V_P$ to the virtual horizontal plane formed by the X and Y directions of the pointer antenna 38. In general, the receiver 12 is pointing at the energized line 100 when $V_P$ lies within this virtual horizontal plane. This is true only when the Z-component of $V_P$ vanishes. This result is inferred directly from the cylindrical nature of the magnetic flux field around a current-carrying line. The cylindrical field also dictates the interpreted direction of the line. The line 100 is assumed by the microcontroller 112 of the receiver 12 to run in a direction that is orthogonal to the direction of $V_P$.

Many modifications and variations are possible in light of the above teaching. The foregoing is a description of the preferred embodiments of the invention and has been presented for the purpose of illustration and description. It is not intended to be exhaustive and so limit the invention to the precise form disclosed.

The invention is to be determined by the following claims:

I claim:

1. A digital locating receiver for receiving locating signals from underground objects, comprising
    a main body, said main body housing at least one microcontroller and internal circuitry;
    a display screen located on the main body for providing visual feedback to a user;
    a pistol grip for accommodating a hand of a user, said pistol grip including a trigger;
    an antenna arm having a first end and a second end, said antenna arm being swivelably connected to said main body at said first end;
    a first antenna set mounted on said second end of the antenna arm and comprising a set of three mutually orthogonal ferrite antennas;
    a second antenna set housed within the main body of the receiver, said second antenna set being comprised of a set of three mutually orthogonal ferrite antennas;
    wherein said receiver is capable of processing locating signals acquired from an underground object by said first and second antenna sets, and producing an output on said display screen, said output representing a predicted location of the underground object.

2. The digital locating receiver of claim 1, wherein said first antenna set and said second antenna set are 21 inches apart from each other.

3. The digital locating receiver of claim 1, wherein said first antenna set and said second antenna set are separated by a predetermined distance.

4. The digital locating receiver of claim 1, further comprising a speaker for producing audible feedback for a user, said speaker being housed within the main body of said receiver.

5. The digital locating receiver of claim 1, further comprising a battery compartment for storing batteries, said battery compartment housed within the main body of said receiver.

6. The digital locating receiver of claim 1, further comprising a connection panel, said connection panel being located on the main body of said receiver and comprising a plurality of inlets adapted to accommodate accessory cables.

7. The digital locating receiver of claim 1, wherein said output on the display screen includes an arrow representing the predicted direction of said underground object with respect to said receiver.

8. The digital locating receiver of claim 1, wherein said output on the display screen includes a graphical image of said underground object, said image representing the predicted orientation of said underground object in space.

9. The digital locating receiver of claim 1, wherein said output on the display screen includes a predicted depth of said underground object when said receiver is generally positioned over the underground object.

* * * * *